(12) United States Patent
Rajon et al.

(10) Patent No.: US 11,643,026 B2
(45) Date of Patent: May 9, 2023

(54) REINFORCING INSERT WITH THROUGH ORIFICES

(71) Applicant: COMPAGNIE PLASTIC OMNIUM SE, Sainte-Julie (FR)

(72) Inventors: Alexis Rajon, Sainte-Julie (FR); Willem Tchappsky, Sainte-Julie (FR)

(73) Assignee: COMPAGNIE PLASTIC OMNIUM SE

( * ) Notice: Subject to any disclaimer, the term of this patent is extended or adjusted under 35 U.S.C. 154(b) by 380 days.

(21) Appl. No.: 16/929,967

(22) Filed: Jul. 15, 2020

(65) Prior Publication Data
US 2021/0016723 A1    Jan. 21, 2021

(30) Foreign Application Priority Data

Jul. 15, 2019  (FR) ...................................... 1907931

(51) Int. Cl.
| | |
|---|---|
| *B60R 13/01* | (2006.01) |
| *B29K 705/12* | (2006.01) |
| *B29L 31/30* | (2006.01) |
| *B29C 45/14* | (2006.01) |

(52) U.S. Cl.
CPC ...... *B60R 13/011* (2013.01); *B29C 45/14819* (2013.01); *B29K 2705/12* (2013.01); *B29L 2031/3014* (2013.01)

(58) Field of Classification Search
CPC ..... B60J 5/107; B60J 5/101; B60J 5/10; B60J 5/108; B29C 45/14819; B29C 2705/12; B29C 45/14327; B60R 13/011; B29K 2705/12

USPC ....................... 296/146.6, 146.8, 29, 30, 106
See application file for complete search history.

(56) References Cited

U.S. PATENT DOCUMENTS

| | | | |
|---|---|---|---|
| 6,701,689 B2* | 3/2004 | diGirolamo ............. | E04B 2/763 52/243 |
| 2009/0017242 A1* | 1/2009 | Weber .................. | B23K 26/382 428/161 |
| 2009/0126103 A1* | 5/2009 | Dietrich .................. | E03C 1/021 4/695 |
| 2019/0193534 A1* | 6/2019 | Chiba ...................... | B60J 5/102 |

(Continued)

FOREIGN PATENT DOCUMENTS

| | | |
|---|---|---|
| DE | 102012212816 A1 | 5/2014 |
| DE | 102013200677 A1 | 7/2014 |
| EP | 1927453 A1 | 6/2008 |

(Continued)

OTHER PUBLICATIONS

Machine translation of KR 101972021 (Duck Yang Industries).*
Search Report and Written Opinion Issued in French Patent Application No. FR1907931, dated Mar. 16, 2020, 6 pages.

*Primary Examiner* — Dennis H Redder
*Assistant Examiner* — Kevin P Weldon
(74) *Attorney, Agent, or Firm* — Dilworth IP, LLC

(57) ABSTRACT

A reinforcing element for a bodywork part made from plastic, forming an insert capable of being at least partially overmolded in the bodywork part, the reinforcing element including a wall delimited by a contour, the wall including an orifice that passes all the way through the thickness of the wall of the reinforcing element, which orifice is a notch emerging at the contour, or a blind orifice at the contour, located, at least in part, in an area of the contour that extends over 40 mm in width from the wall.

10 Claims, 3 Drawing Sheets

(56) References Cited

U.S. PATENT DOCUMENTS

2020/0018063 A1\* 1/2020 LeBlang .................. F16B 7/22

FOREIGN PATENT DOCUMENTS

| EP | E P-3453510 | A1 | * | 3/2019 | ....... B29C 45/14311 |
| FR | 2908067 | A1 | * | 5/2008 | ....... B29C 45/14631 |
| FR | 2995813 | A1 | * | 3/2014 | ......... B29C 45/0005 |
| KR | 101972021 | B1 | | 4/2019 | |
| WO | 2009143627 | A1 | | 12/2009 | |
| WO | WO-2011063538 | A1 | * | 6/2011 | .............. B60J 5/101 |

\* cited by examiner

[Fig. 1]
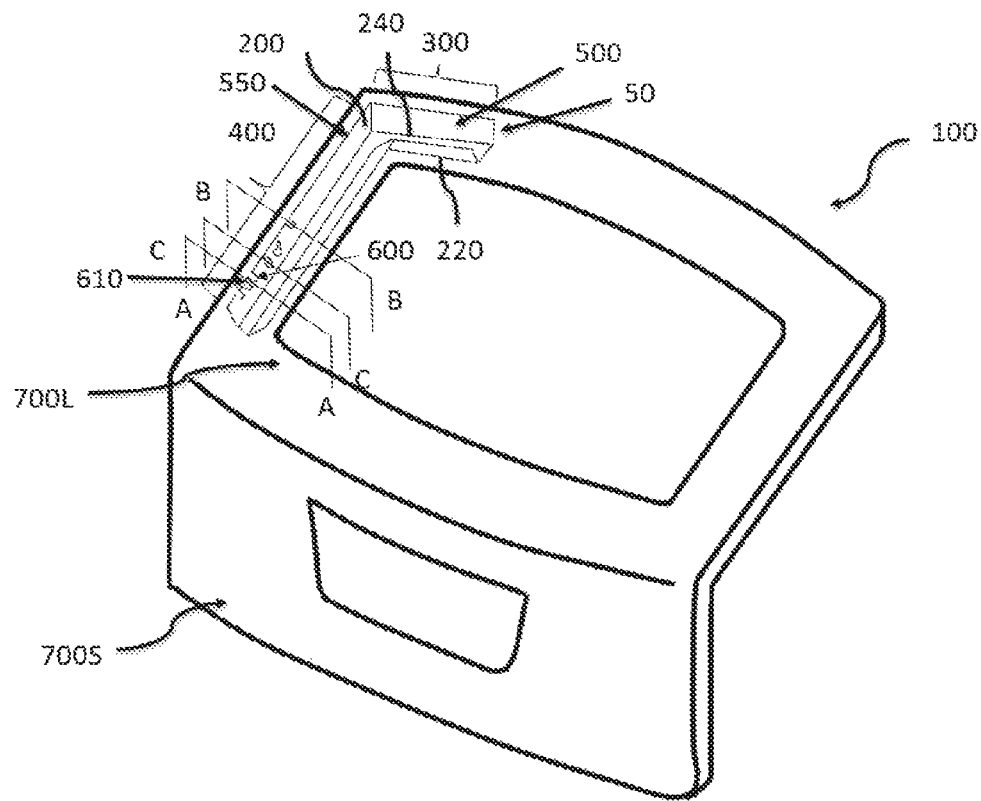
[Fig. 2]
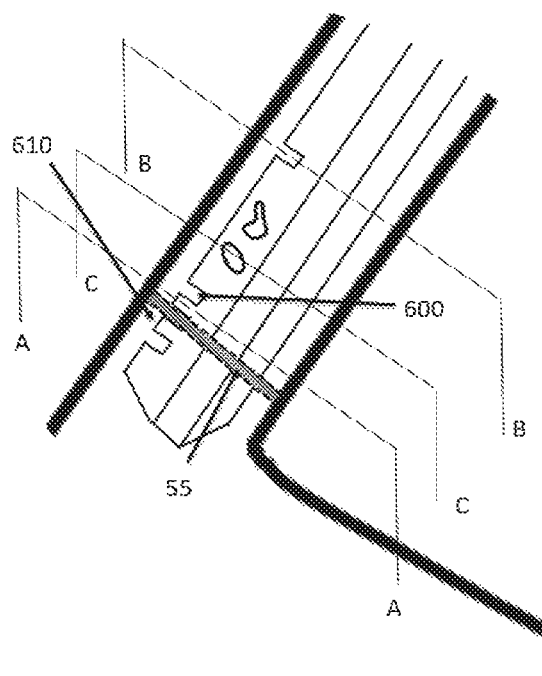

[Fig. 3]
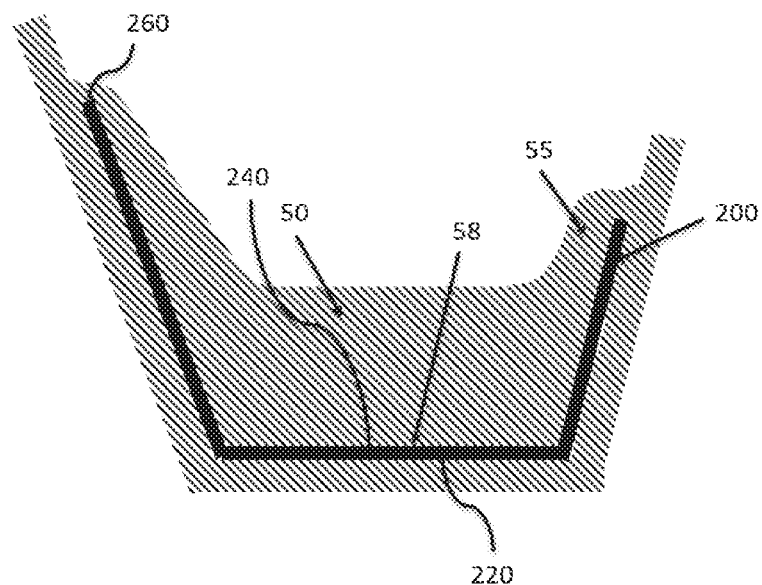
[Fig. 4]
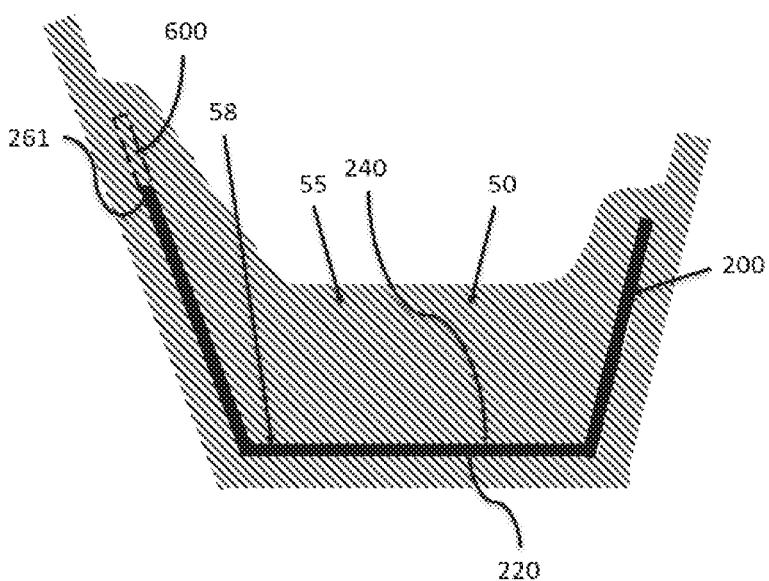

[Fig. 5]
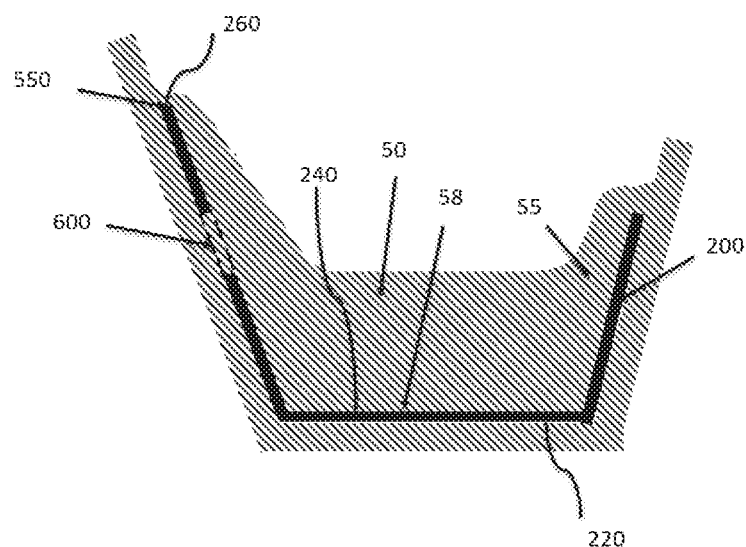
[Fig. 6]
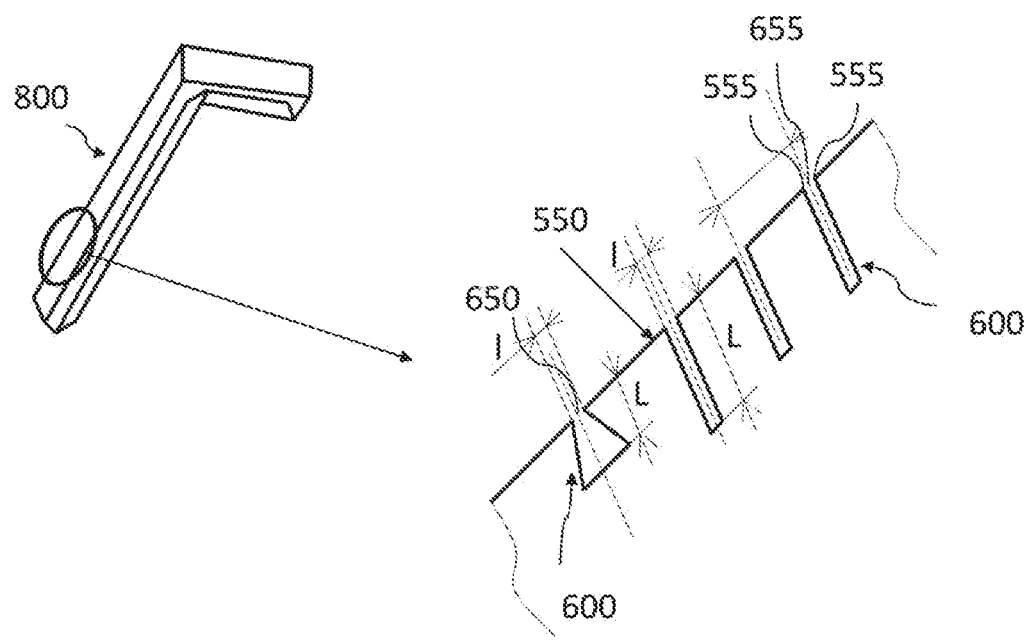

REINFORCING INSERT WITH THROUGH ORIFICES

FIELD OF THE INVENTION

The invention relates to the automotive industry, and in particular the field of plastic bodywork parts locally reinforced with molded inserts.

BACKGROUND OF THE INVENTION

In particular, the invention relates to a reinforcing element of the insert type, capable of being molded locally in a bodywork part in order to reinforce it mechanically. The insert may be made of metal, in particular steel, or of composite plastic material. The bodywork part can be a tailgate or a side door.

A rear opening of the tailgate type, in particular made of plastic material, comprising an outer trim skin and an inner lining of structure made of filled thermoplastic material, is known in the prior art. The thermoplastic material constituting the lining is for example filled with glass fibers or talc in order to increase its mechanical strength properties.

The tailgate lining undergoes many mechanical stresses during its manufacture, mainly geometric deformations inherent to the molding process, and mechanical stresses during its use once it is assembled on the vehicle.

In order to better withstand the mechanical operating forces on the vehicle, the inner lining is generally reinforced by reinforcing elements. Document EP1927453 the applicant shows that the reinforcing elements can be overmolded in the thermoplastic material of the lining at the hinge, ball joint or lock areas, in order to offset the various forces produced by the equipment (jacks, stops or gasket) and which generate deformations.

The reinforcement efficiency of the overmolded insert depends on the quality and robustness of the mechanical coupling between the bodywork part and the reinforcing insert.

It is known to perform mechanical blocking of the reinforcing insert in the part, by at least partially encapsulating the overmolded insert in the plastic. Encapsulation consists of overmolding the insert by at least partially covering two of its opposite faces, or more generally, at a given point of the insert, it is overmolded on either side of this point.

This encapsulation can be located at the periphery of the overmolded insert, the overmolded material passing from one face of the part to the other, bypassing and covering the part edge. This peripheral overmolding of the edge makes it possible to compensate for the geometric dispersions linked to the dimensions of the insert and to avoid any positioning interference with the matrix of the mold.

It is also known to perform a mechanical blocking of the reinforcing insert in the part, by providing the overmolded insert with orifices, called "anchor orifices," passing through the thickness of the insert, and through which the plastic material passes to thus ensure mechanical retention of the two elements (insert and part).

However, the bodywork part and the insert exhibit differences in expansion under the effect of temperature, due to the fact that the part and the insert are made of materials having a different CLTE ("Coefficient of Linear Thermal Expansion"). This generates stresses that can create brittleness in the plastic. When the plastic shrinks or expands on the insert, it is stressed at the various overmolding zones: through orifices and peripheral overmolding. The mechanical forces and the repeated temperature variations generate local stresses that can induce cracks in the peripheral overmolding zones of the edge.

It would have been possible to consider addressing this problem by increasing the thickness of the edge overmolding, or by using a stronger plastic, solutions which generate an increase in the mass of the assembly of the part and the insert.

SUMMARY

The object of the invention is in particular to address the problem by providing a reinforcing insert whose structure makes it possible to relax the stresses between the insert and the bodywork part, and to locally increase the interface length "at the edge" between the insert and the overmolding produced by the plastic part, and thus to promote coupling in this zone.

To that end, the object of the invention is a reinforcing element for a plastic bodywork part, forming an insert capable of being at least partially molded into the bodywork part, the reinforcing element comprising a wall delimited by a contour, the wall comprising several orifices that pass all the way through the thickness of the wall of the reinforcing element, which orifices are each:

a notch opening at the contour.

The presence of the overmolded through orifice in the insert, that is to say the notch, locally gives the insert an additional deformation ability, in the event of thermal expansion, or mechanical stress.

The term "area of the contour" is understood to mean an area whereof one of the boundaries is formed by the contour of the wall of the reinforcing element.

The term "length of the wall of the reinforcing element" is understood here to mean its dimension in the direction of its greatest reach. The term "width of the wall of the reinforcing element" means its dimension in the direction perpendicular to the length. Lastly, the term "thickness of the wall of the reinforcing element" means its third dimension, other than the length and the width, which is the smallest of the dimensions of the wall of the reinforcing element.

The term "notch" here refers to a recess of elongated shape, emerging at the contour through an opening of small width. The notches can have a rectangular shape in the local plane of the wall of the reinforcing element. However, they could also include a constriction, or else be flared starting from the edge of the contour, thus for example having a shape of the "puzzle piece" type, for instance in the form of a T, or a dovetail, a trapezoid, optionally with rounded corners, an omega, an ellipse, an arc of circle. The opening of the notch is a space delimited by the two ends of the contour at which the latter is interrupted to form the notch. The opening extends over the width of the notch at the contour. Within the meaning of the invention, the width of the opening is the shortest distance connecting the two ends of the contour delimiting the opening of the notch.

The reinforcing element can also comprise an orifice that passes all the way through the thickness of the wall of the reinforcing element, or through orifice, and which is does not emerge at the contour. The latter is different from the anchor orifices provided to ensure mechanical blocking of the reinforcing insert. According to the invention, this blind orifice is not necessarily intended to be located under an overmolding rib of the bodywork part. Furthermore, it is located in an area close to the edge of the insert, that is to say an area of the contour that extends over about 40 mm in width from the wall. This through orifice, which does not emerge at the contour, is located entirely in the area of the contour that extends over 40 mm in width.

According to other optional features of the reinforcing element, taken alone or in combination:

The notch emerges at the contour of the wall by an opening whose width, which is the width of the notch at the contour, is smaller than the length of the notch. Preferably, the width is less than ½ of the length, still more preferably less than ⅓ of the length, and even more preferably less than ¼ of the length. The length is the largest dimension of the notch. It extends from the opening to the bottom of the notch.

The reinforcing element is made of metal, preferably steel.

The through orifice is intended to be located partially or entirely under an overmolding rib of the bodywork part. This further contributes to the fact that the plastic passes from one face of the insert to the other, during the overmolding, and therefore contributes to the good cohesion of the plastic.

The through orifice is not intended to be located under an overmolding rib of the bodywork part.

The through orifice is located under the base of an overmolding rib of the bodywork part.

The reinforcing element comprises several similar through orifices in terms of shape, distributed evenly over at least part of the contour. "Distributed evenly over at least part of the contour" means that on this part of the contour, the centers of the openings of a pair of two successive notches are separated by a distance that is identical, irrespective of the considered pair of notches. On said part of the contour, the through orifices, that is to say the notches, can be identical or different.

The reinforcing element comprises several similar through orifices in terms of shape, distributed unevenly over at least part of the contour. On this part of the contour, the centers of the openings of a pair of two successive notches are separated by a distance that is not identical for all of the pairs of successive notches. On said part of the contour, the through orifices, that is to say the notches, can be identical or different.

The reinforcing element has a U-shaped section, and the notches are on the side part of the wall of the reinforcing element.

The invention also relates to a motor vehicle bodywork part made of plastic. It comprises a reinforcing element as described above.

According to other optional features of the motor vehicle bodywork part, taken alone or in combination:

The plastic material fills the through orifice.

The through orifice is not filled with plastic. To do this, key forms are present in the mold to save these orifices from the propagation of material during the injection.

The invention also relates to a motor vehicle bodywork part made of plastic material, which comprises a reinforcing element forming an insert capable of being at least partially molded into the bodywork part. The reinforcing element comprises a wall delimited by a contour. The wall comprises an orifice that passes all the way through the thickness of the wall of the reinforcing element, which orifice is not intended to be located under an overmolding rib of the bodywork part.

The bodywork parts according to the invention may constitute tailgate linings.

BRIEF DESCRIPTION OF THE FIGURES

The invention will be better understood upon reading the description which follows, given solely by way of example and with reference to the appended drawings in which:

FIG. 1 is a perspective view of a tailgate lining comprising a reinforcing element according to an embodiment of the invention, overmolded at a stress zone of the lining.

FIG. 2 is a detail of FIG. 1, illustrating orifices present in the reinforcing element.

FIG. 3 is a sectional view along A-A of the tailgate lining of FIG. 1, at an area having no through orifice.

FIG. 4 is a sectional view along B-B of the tailgate lining of FIG. 1, at a through orifice.

FIG. 5 is a sectional view along C-C of the tailgate lining of FIG. 1, at another through orifice.

FIG. 6 is a perspective view of a reinforcing element according to another embodiment of the invention, as well as a detail of this reinforcing element.

DETAILED DESCRIPTION

FIGS. 1 to 5 show a plastic bodywork part 50 according to one embodiment of the invention, designated by general reference 100. According to this example, it is a tailgate lining 100, comprising a molded reinforcing insert, forming a reinforcing element 200 at the stress zone of the lining 100, namely the upper zone 300 for fixing hinges (not shown) and the side zone 400 for relieving forces from jacks (not shown). The reinforcing element could be located in other stress zones, such as the lower side zone 700L of the back window and the lock zone 700S.

The reinforcing element 200 forms an insert able to be at least partially molded into the bodywork part 100. It comprises a wall 500 delimited by a contour 550, also called "part end." The wall comprises orifices 600 that pass all the way through the thickness of the wall 500 of the reinforcing element 200. The orifices 600 are located in an area of the contour 550 that is 40 mm wide. In this embodiment, the through orifices 600 are notches opening at the contour 550 delimiting the wall 500 of the reinforcing element 200 by an opening 650, like the orifice at which the section plane B-B passes. In this embodiment, the reinforcing element also comprises blind orifices at the contour, such as the orifice at which the section plane C-C passes.

The through orifices 600 are advantageously intended to be located opposite the plastic areas of the bodywork part 100, which may have a brittleness created by the stresses due to the difference in CLTE between the plastic material 50 forming the bodywork part 100 and the material forming the insert 200. In this embodiment, the reinforcing element 200 is preferably made of metal, more particularly of steel. It is also possible that the insert is made of composite material, such as SMC ("Sheet Molding Compound"). These fragile areas of the plastic are areas of stress concentration that can be pre-identified by calculation or owing to the experience of a person skilled in the art. They can also be identified following validation tests of the specifications.

The figures illustrate the fact that in this embodiment, the reinforcing element 200 has a U-shaped section. The notches 600 are on the side part of the wall 500 of the reinforcing element 200. The reinforcing element could just as easily have another shape, for example in the lock area 700S, or a flat shape for a side door reinforcement. On the tailgate mounted on the vehicle, the "inner" face 220 of the reinforcing element 200 is oriented towards the interior of the vehicle and, in this example, makes up the hollow of the U shape, and its "outer" face 240 is oriented towards the outside of the vehicle.

FIG. 3 is a sectional view along A-A of the tailgate lining 100. The section is done outside the through orifices 600. The reinforcing element 200 is overmolded by the plastic 50 forming the inner lining 100 of the tailgate at least on its inner face 220. Since it is a tailgate, the inner face of the reinforcing element could be visible if it was not overmolded. The overmolding here hides the reinforcing element. However, if the element 200 was reinforcing a technical part 100, which is not visible, the overmolding could be partial. Even in the case of a visible part 100, the overmolding could be partial. The visible areas that are not overmolded could be hidden by trim.

On its hollow face 240, the reinforcing element 200 has a rib 55 obtained by overmolding with the same plastic material 50. For the sake of clarity, the overmolding ribs 55 are not shown in FIG. 1, and only one of these is shown in FIG. 2 in detail. The ribs of FIGS. 3 to 5 are also not shown there. On the hollow face 240, the plastic 50 forming the rib 55 is overmolded so that the edges 260 of the wall 500 of the insert 200 are covered at the contour 550 with plastic 50.

FIG. 4 is a sectional view along line B-B of the tailgate lining 100. The section is done at a notch 600, shown by the dotted line. Due to the through orifice 600, the edge 261 forming the bottom of the notch is offset relative to the edge 260 in the area without a through orifice illustrated in FIG. 3. As illustrated in FIG. 4, the through orifice 600 is intended to be located partially or entirely under an overmolding rib 55 of the bodywork part 100. In this embodiment, the notch 600 is located under the base 58 of the overmolding rib 55. In the bodywork part 100, the plastic 50 fills the through orifice 600.

FIG. 5 is a sectional view along C-C of the tailgate lining 100. The section is done at a through orifice 600, shown by the dotted line, which is blind at the contour 550. As illustrated in FIG. 5, the through orifice 600 is intended to be located partially or entirely under an overmolding rib 55 of the bodywork part 100. In the bodywork part 100, the plastic 50 fills the through orifice 600, which is blind at the contour 550.

In FIGS. 1 to 5, the orifices 600 according to the invention are entirely located in an area of the contour 550 that extends over 40 mm in width from the wall 500.

The notches 600 emerge at the contour of the wall by an opening whose width, which is the width of the notch at the contour, is smaller than the length of the notch. The grouped notches 600, located at the end of the side upright zone 400, are through orifices that can be similar in terms of shape, and/or can be distributed evenly over part of the contour 550, that is to say with an identical spacing between them. Indeed, on this part of the contour, the centers of the openings of a pair of two successive notches are separated by a distance that is identical, irrespective of the considered pair of notches. Conversely, the notch 600 located towards the middle of the side upright zone 400 does not form a set of through orifices with the other notches distributed evenly over part of the contour 550 because the spacing between this notch and the previous notch is greater than the spacing between the three notches located at the end of the side zone 400. Two successive notches 600 define a relief 610 between them having, in projection in the local plane of the wall 500, a shape complementary to that of its two adjacent notches. Thus, the part of the contour 550 of the wall 500 comprises a succession of notches 600 and reliefs 610, defining a typical shape called "slotted".

In the embodiment of FIG. 1, the notches have a rectangular shape in the local plane of the wall 500 of the reinforcing element. However, they could also include a constriction, or else be flared starting from the edge of the contour, thus for example having a shape of the "puzzle piece" type, for instance in the form of a T, optionally having rounded corners, or in the form of a dovetail shape, a trapezoid, optionally with rounded corners, an ellipse, an omega or an arc of circle.

FIG. 6 shows a reinforcing element 800 according to another embodiment of the invention. The reinforcing element 800 has a U-shaped section. Four notches 600 are visible in the detailed view of the reinforcing element shown in FIG. 6. They are located in the side part of the wall 550 of the reinforcing element 800. Among these notches 600, three have a rectangular shape in the local plane of the wall 550 of the reinforcing element. The other notch 600 has a dovetail shape. Each notch 600 is a recess of elongated shape, emerging at the contour 550 by an opening 650 of narrow width I. The width I, which has the width of the notch 600 at the contour 550, is smaller than the length L of the notch. The reinforcing element 800 therefore comprises several through orifices (notches 600) with similar shapes. Indeed, it comprises three rectangular notches. These are distributed evenly over at least part of the contour 550. Indeed, on this part of the contour 550, the centers 655 of the openings 650 of a pair of two successive rectangular notches 600 are separated by a distance that is identical, irrespective of the considered pair of rectangular notches. On said part of the contour 550, identical notches (rectangles of equal size) can be seen. Conversely, the center of the opening of the dovetail-shaped notch is located at a distance from the center of the opening of the closest rectangular notch, which is different in this embodiment from the distance separating the centers of the openings of two successive rectangular notches.

The invention is not limited to the embodiments described here, and other embodiments will become clearly apparent to a person skilled in the art. It is in particular possible that the bodywork part is for example a side door. The overmolded reinforcing insert could be present at another stress zone, for example a lower side zone of the back window 700L or in the lock area 700S. The through orifice may not be located under an overmolding rib. The through orifice may not be located entirely in the area of the contour that extends over 40 mm in width.

LIST OF REFERENCES

50: composite plastic material
55: overmolding rib
58: base of the overmolding rib 55
100: composite plastic bodywork part
200: reinforcing element for the bodywork part 100 made of composite plastic
220: "inner" face of the reinforcing element 200
240: "outer" face of the reinforcing element 200
260: edge of the reinforcing element 200
261: bottom of the notch
300: upper hinge fixing area
400: side force relief area from jacks
500: wall of the reinforcing element 200
550: contour delimiting the wall 500 of the reinforcing element 200
555: ends of the contour delimiting the opening of the notch
600: orifice that passes all the way through the thickness of the reinforcing element 200, notch
610: relief between two notches 600
650: opening of the notch
655: center of the opening of the notch
700L: lower side area of the back window
700S: lock area
800: reinforcing element L: length of the notch
I: width of the opening of the notch

The invention claimed is:

1. A bodywork part of a motor vehicle, made of plastic, characterized in that the bodywork part comprises a reinforcing element forming an insert capable of being at least partially overmolded in the bodywork part, the reinforcing element comprising a wall delimited by a contour, the wall comprising several orifices that pass all the way through a thickness of the wall of the reinforcing element, wherein the orifices are each a notch emerging at the contour of the wall by an opening with a width (I) that is smaller than a length (L) of the notch.

2. The bodywork part of a motor vehicle according to claim 1, wherein the plastic fills the orifice.

3. The bodywork part of a motor vehicle according to claim 1, forming a tailgate lining.

4. The bodywork part of a motor vehicle according to claim 1, wherein the reinforcing element is made from metal.

5. The bodywork part of a motor vehicle according to claim 1, wherein the reinforcing element is made from steel.

6. The bodywork part of a motor vehicle according to claim 1, wherein the orifices are configured on the reinforcing element so that the orifices are located partially or entirely under an overmolding rib of the bodywork part.

7. The bodywork part of a motor vehicle according to claim 1, wherein the orifices are configured on the reinforcing element so that the orifices are located under a base of an overmolding rib of the bodywork part.

8. The bodywork part of a motor vehicle according to claim 1, wherein the reinforcing element comprises several similar orifices in terms of shape distributed evenly over at least part of the contour.

9. The bodywork part of a motor vehicle according to claim 1, wherein the reinforcing element has a U-shaped section, wherein the notches are on a side part of the wall of the reinforcing element.

10. A bodywork part of a motor vehicle made of plastic, characterized in that the bodywork part comprises a reinforcing element forming an insert capable of being at least partially molded into the bodywork part, the reinforcing element comprising a wall delimited by a contour and an overmolding rib, the wall comprising an orifice that passes all the way through a thickness of the wall of the reinforcing element, wherein the orifice is not located under the overmolding rib of the bodywork part.

* * * * *